(No Model.)
F. W. ARVINE.
APPARATUS FOR TESTING THE BURNING QUALITIES OF OIL.
No. 431,795. Patented July 8, 1890.
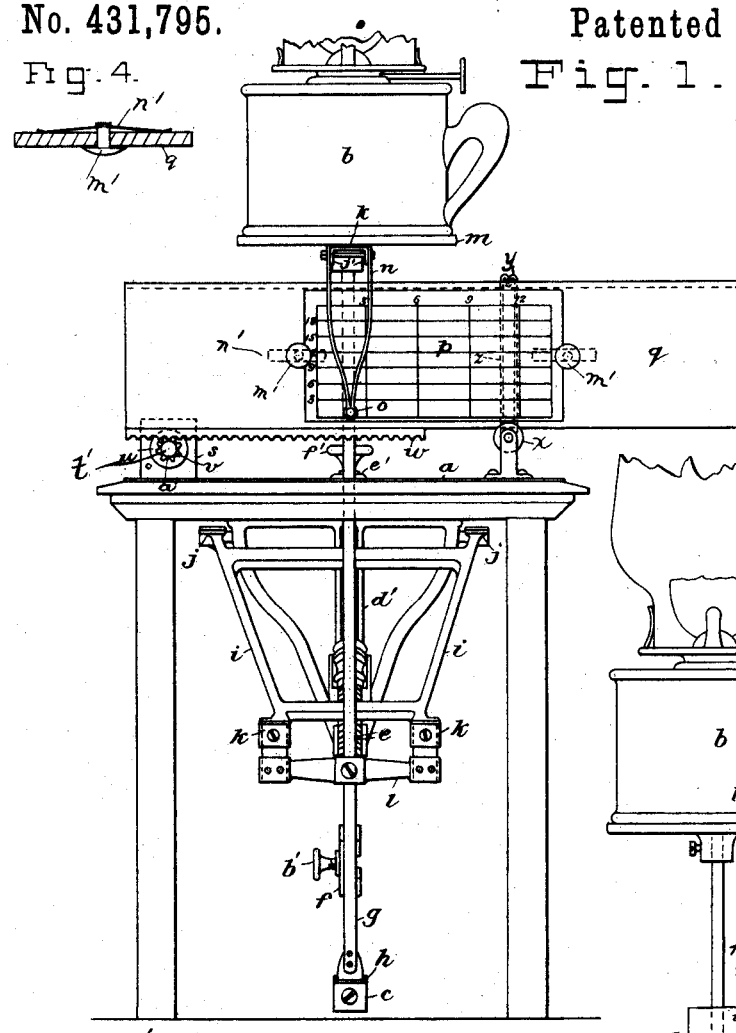

UNITED STATES PATENT OFFICE.

FREELING W. ARVINE, OF NEW BRIGHTON, ASSIGNOR TO FREDERICK LEU, OF BROOKLYN, NEW YORK.

APPARATUS FOR TESTING THE BURNING QUALITIES OF OIL.

SPECIFICATION forming part of Letters Patent No. 431,795, dated July 8, 1890.

Application filed October 4, 1889. Serial No. 326,042. (No model.)

*To all whom it may concern:*

Be it known that I, FREELING W. ARVINE, a citizen of the United States, and a resident of New Brighton, in the county of Richmond and State of New York, have invented new and useful Improvements in Apparatus for Testing the Burning Qualities of Oil, of which the following is a specification.

My invention consists of a simple apparatus for testing the burning quality of kerosene and other oils by poising the burning-lamp so as to rise gradually as the oil burns away and carry a marking pencil or pen, or other marking-point, in combination with a laterally-moving recording-card operated by a clock-motor to record the rate of combustion by the diagram produced on the card, as hereinafter fully described, reference being made to the accompanying drawings, in which—

Figure 1 is a front elevation of my improved apparatus. Fig. 2 is partly a side elevation and partly a sectional elevation. Fig. 3 is a detail of the apparatus as seen in Fig. 2, and on an enlarged scale and partly in section. Fig. 4 is a detail illustrating the card-fastening device.

Under any suitable table or bench $a$, I arrange the poising or suspending apparatus for supporting the test-lamp $b$ above said table, consisting of the lever $c$, having the fulcrum at $d$, and being suspended by the spring $e$ at $f$, and carrying the lamp-supporting standard $g$ at $h$, together with the parallel-motion strut $i$, having laterally-separated supporting-joints $j$, and similarly-placed joints $k$, connecting it with the cross-bar $l$ of the standard $g$, to hold and carry the standard vertically, and steady it in its vertical position, said strut being preferably located above the lever and close under the table-top; but it may be placed below and the lever above, if desired.

The lamp-supporting standard extends up through the top $a$ of the table or bench a suitable distance and carries at its upper end a lamp-holding plate $m$, from the bottom of which a pen or pencil carrying hanger $n$ is suspended alongside of and so that the marking-point $o$ bears gently against the surface of a card $p$ on the side of the movable tablet $q$, set up edgewise, so that as said tablet moves longitudinally along the marking-point and the said point rises along the tablet a diagonal line is recorded on the card, which, together with the cross-lines and their numbers on the card, gives the record of the test by the height and length of the line produced in a given time or by a given quantity burned. For so moving the tablet along the marking-point I employ a small clock-motor $s$, having the arbor $t$ of the minute-hand extended out through the back of the clock-case and coupled with a shaft $t'$, carrying a roller $u$, on which one margin of the lower edge of the tablet $q$ rests, said shaft also carrying a pinion $v$, which gears with the rack $w$ of the other margin of said lower edge of the tablet to carry and work the tablet, which, for its other support, rests on the carrying-roller $x$, and at its upper edge is controlled by the downwardly-projecting guide $y$, entering the groove of the upper edge of the tablet, said guide being supported by the standard $z$. The shaft $t'$, coupled with the clock and the carrying-roller $u$, and working-pinion $v$, also has a thumb-bit $a'$, by which to shift the tablet for setting the starting-point of the card coincident with the pencil.

The spring $e$ is connected to the lever $c$ by the sliding box $f$, with a binding-screw $b'$ for adjusting the sliding box $f$ along the lever, as may be desired, for regulating the rise and fall of the marking-point to the dimensions of the card. Said spring is also adjustably connected at the other end, in this case being connected to the vertically-adjustable slide $c'$, fitted in ways of the hanger $d'$, and provided with the adjusting-screw $e'$, extended up through the table whereon it is mounted, so as to be confined lengthwise and having a thumb-bit $f''$ at the upper end for turning it. This is to adjust the tension of the spring to the weight of the lamp and aid in accurate adjustment of the throw of the lever for different weights of lamps. The spring is connected to this slide by clamping one end of the block $g'$, from the other end of which the spring extends to the face of the bracket $h'$ by the thumb-screw $i'$, extending through the bracket into said block. The poise-lever $c$ may be delicately adjusted to some extent by slackening or tightening this clamping-screw for accurately setting the marking-point on the starting-line of the card.

In practice the spring is to be adjusted so that when the charged lamp is placed on the holder the marking-point will drop to the lower line of the card. The marking-point then describes a line the form of which is indicative of both the rate of consumption for each hour and also the time of burning the contents of the lamp. This line by its peculiar curves or straightness is an exact indication of the illuminating value of the oil in the particular kind of lamp used in the test.

The pencil-carrying hanger $n$ is pivoted to the ears $j'$ of a spring-plate $k'$, riveted to the under side of plate $m$ at $l'$. It hangs free and so that it gravitates against the card with sufficient pressure for marking the card. The upward pressure of the end of the hanger against the table has a like, though slight, tendency, and the same action of the spring holds the pencil-hanger up, as indicated in dotted lines, Fig. 2, when shifted to be out of the way of adjusting the cards on the tablet, the spring then having more effect in consequence of the short arm of the hanger being pressed sidewise against the table.

For fastening the card $p$ to the tablet $q$, I have provided a simple grip device consisting of a stud $m'$, having a large head, the stem of which extends loosely through the tablet and a suitable distance beyond, and is fastened at the end to the bow-spring $n'$, the ends of which bear against the back side of the tablet, and the spring is adjusted to suitable tension for holding the card by the margins of its opposite ends inserted under the heads, two of the fasteners being used. It will be seen that by pressing the springs with one finger the fastener-heads will be thrust back to allow the card to be inserted or removed, and the heads instantly grip the inserted card when the finger is removed from the spring. I do not limit myself to the particular arrangement of poising apparatus, nor to the particular means of holding or moving the card, as these may be varied more or less. The essential features of my invention are means to poise the lamp, in combination with the moving card-holder and the marking-point.

I claim as my invention—

1. The combination, in an instrument for testing the burning quality of oil, of a lamp-poising support, a marking-point carried by said support, and a movable card-holder, substantially as described.

2. The combination of poise mechanism consisting of the poise-lever having its fulcrum at one end, the suspending spring coupled with said lever intermediately, the lamp-supporting standard connected to the other end of said lever, and the parallel-motion strut having a jointed support vertically to the fulcrum of the lever, and also having jointed connection with the lamp-support vertically to the connection of said lever with said standard, substantially as described.

3. The combination of poise mechanism consisting of the poise-lever having its fulcrum at one end, the diagonal suspending spring coupled with said lever intermediately, the lamp-supporting standard connected to the other end of said lever, and the parallel-motion strut having laterally-separated jointed supports vertically to the fulcrum-support of the lever, and also having laterally-separated jointed connections with the arm of the lamp-standard vertically to the connection of said lever with said standard, substantially as described.

4. The combination, with the poised lamp-supporting standard having the pendent marking-pencil, of the vertically-arranged and longitudinally-moving card-holding tablet, substantially as described.

5. The combination, with the poised lamp-supporting standard having the pendent marking-pencil, of the vertically-arranged and longitudinally-moving card-holding tablet, and the clock-motor geared with said tablet, substantially as described.

6. The combination, with the poise-lever, spring, strut, lamp-supporting standard, and the marking-pencil pendent from the lamp-support, of the vertically-arranged longitudinally-moving card-holding tablet, and clock-motor geared with said tablet, substantially as described.

7. The combination, with the poise-lever, parallel-motion strut, and the lamp-supporting standard, coupled substantially as described, of the suspending-spring adjustably connected with said lever, substantially as specified.

8. The combination, with the poise-lever, parallel motion-strut, and lamp-supporting standard, coupled substantially as described, of the suspending-spring adjustably connected with said lever and also adjustably connected with the supporting-hanger, substantially as described.

9. The combination, with the poise-lever and the hanger from which said lever is suspended, of the diagonally-arranged doubly-adjusting spring, and the lamp-support, substantially as described.

In testimony that I claim the foregoing as my invention I have signed my name, in presence of two witnesses, this 7th day of August, 1889.

FREELING W. ARVINE.

Witnesses:
  WILFRED B. EARLL,
  W. J. MORGAN.